(12) United States Patent
Herpich et al.

(10) Patent No.: US 6,593,418 B2
(45) Date of Patent: Jul. 15, 2003

(54) SILICA GEL-CONTAINING RUBBER COMPOUNDS WITH ORGANOSILICON COMPOUNDS AS COMPOUNDING AGENT

(75) Inventors: Rüdiger Herpich, Mannheim (DE); Thomas Früh, Ludwigshafen (DE); Ludger Heiliger, Neustadt (DE); Kurt Schilling, Schwetzingen (DE)

(73) Assignee: Rhein Chemie Rheinau GmbH, Monheim (DE)

( * ) Notice: Subject to any disclaimer, the term of this patent is extended or adjusted under 35 U.S.C. 154(b) by 0 days.

(21) Appl. No.: 09/951,041

(22) Filed: Sep. 12, 2001

(65) Prior Publication Data

US 2002/0055588 A1 May 9, 2002

(30) Foreign Application Priority Data

Sep. 13, 2000 (DE) .......................... 100 45 166

(51) Int. Cl.$^7$ ............................... C08L 83/00
(52) U.S. Cl. .................. 524/588; 560/128; 560/147; 560/205; 560/225; 568/852; 556/414; 524/492; 528/74.5; 525/479
(58) Field of Search ................. 560/128, 147, 560/205, 225; 568/852; 556/414; 525/479; 524/492, 588; 528/74.5

(56) References Cited

U.S. PATENT DOCUMENTS

| 3,015,636 A | 1/1962 | Elmer .......................... 260/18 |
| 3,714,110 A | * 1/1973 | Verdol et al. |
| 4,278,587 A | 7/1981 | Wolff et al. .............. 260/42.37 |

FOREIGN PATENT DOCUMENTS

| DE | 863 403 | 1/1953 |
| DE | 2 319 160 | 10/1974 |

OTHER PUBLICATIONS

Gummi Fasern Kunstsoffe, vol. 51, (month unavailable) 1998, pp. 416–424, 25 Jahre Organosilane in der Reifenanwendung, Herrn Dr. S. Wolff gewidmet.
The International Rubber Chemical & Compounding Conference Nov. 22/23, 1999, Antwerp, Belgium, Processing of the Organo Silane Si 69, H.–D. Iun=ginsland.

* cited by examiner

Primary Examiner—Robert Dawson
Assistant Examiner—Kuo-Liang Peng
(74) Attorney, Agent, or Firm—Joseph C. Gil; Noland J. Cheung; Jennifer R. Seng

(57) ABSTRACT

The present invention concerns new organic silicon networks, their production process and use in silica-containing rubber compounds and vulcanizates manufactured from them.

11 Claims, 1 Drawing Sheet

SILICA GEL-CONTAINING RUBBER COMPOUNDS WITH ORGANOSILICON COMPOUNDS AS COMPOUNDING AGENT

FIELD OF THE INVENTION

The invention concerns new organic silicon networks, a process for their production and use in silica-containing rubber compounds and vulcanizates manufactured from them.

An improvement in mechanical and dynamic properties is achieved by adding organic silicon compounds to silica-containing rubber compounds.

BACKGROUND OF THE INVENTION

The production and use of alkoxysilane-containing compounds in rubber compounds to improve the mechanical and dynamic properties of the vulcanizates is known and described in numerous patents.

For example, the use of 3,3-bis(triethoxysilylpropyl) tetrasulfide in silica-containing rubber compounds improves the wet-slip resistance while at the same time reducing rolling resistance in comparison to carbon black-filled tire tread compounds. During the vulcanization process, the use of SiO$_2$-containing fillers in conjunction with 3,3-bis(triethoxysilylpropyl)tetrasulfide leads to the formation of covalent rubber-filler bonds that provide an abrasion resistance comparable with that of tire tread carbon blacks (U. Görl, *Gummi, Fasern, Kunststoffe*, 1998, 51, 416–421).

3,3-bis(triethoxysilylpropyl)tetrasulfide is a typical representative of this class of compounds.

Although important rubber properties such as the above-mentioned dynamic properties are improved by the use of 3,3-bis(triethoxysilylpropyl)tetrasulfide, this improvement is achieved at the cost of substantially more complex compounding and processing in comparison to rubber compounds filled with carbon black. (H.-D. Luginsland "Processing of the Organo Silane Si 69" The International Rubber Chemicals and Compounding Conference, 22$^{nd}$–23$^{rd}$ Nov. 1999, Antwerp, Belgium).

For instance, silica-filled tire tread compounds containing 3,3-bis(triethoxysilylpropyl)tetrasulfide corresponding to the prior art are extremely susceptible to scorching and must, under no circumstances, exceed the temperature limit of 160° C. during compounding.

Furthermore, little of the high silane content is actually utilized for the coupling reaction with the rubber matrix since a large part of the low-molecular silane disappears into the cavities caused by the microporosity and is unavailable for coupling to the rubber matrix. This means that the expensive silanes have to be used in high molar quantities. This, in turn, increases the cost of the filler system, i.e. silica plus silane, enormously in comparison to a carbon black system that does not require activation.

This, silica-filled tire compounds lead to restrictions in the compounding process, resulting in a decrease in productivity in the tire manufacturer's entire production process, and at the same time, the cost of raw materials for the compound is dramatically increased by the low-molecular silane component.

SUMMARY OF THE INVENTION

Figure 1:
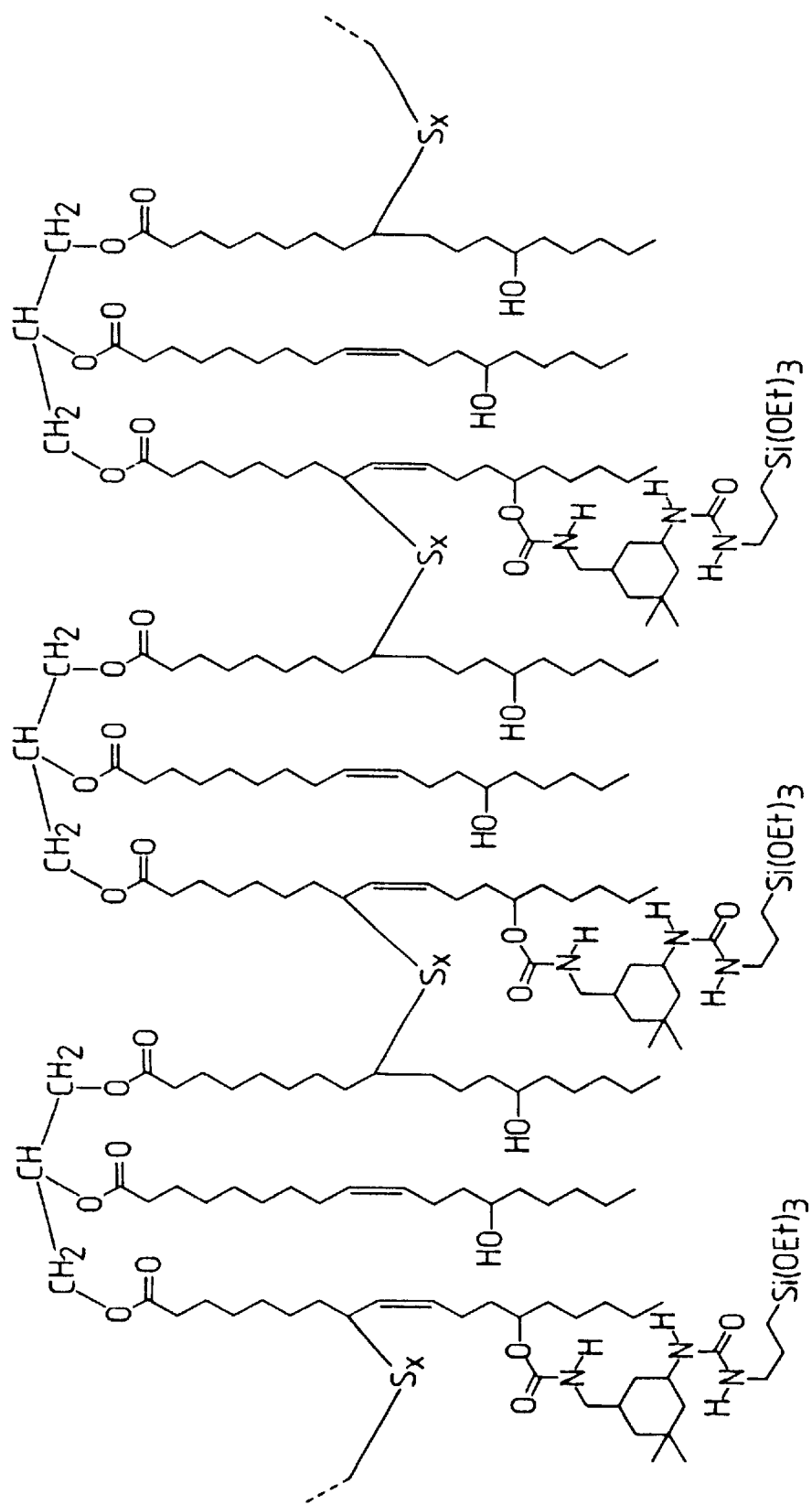
FIG. 1 shows a structure of a network of the present invention.

Therefore, the object was therefore to find filler activators that firstly are based on favorable raw materials, secondly exhibit improved molar utilization of the coupling reaction to the rubber matrix and finally compensate for the drop in productivity in the manufacturing process in comparison to the carbon black-filled systems.

DETAILED DESCRIPTION OF THE INVENTION

The invention provides a network containing esters of one or more unsaturated aromatic or aliphatic hydroxycarboxylic acids and one or more aromatic or aliphatic polyols, crosslinked with sulfur bridges, whereby the network displays a sulfur content in the range from 0.2 wt. % to 17%, preferably 0.5% to 10%, and wherein a) the hydroxycarboxylic acid(s) each have 1, 2 or 3, preferably 1 or 2, olefinic double bonds and 1, 2 or 3, preferably 1 or 2, hydroxyl groups or hydroxyl and isocyanate groups, b) the polyol component(s) each have 1 to 6, preferably 1 to 3, carbon atoms and 1 to 6, preferably 1 to 3, hydroxyl groups and optionally isocyanate groups, c) which have (thio)urethane or urea substituents, which, in turn, have one or more terminal silane substituents according to formula (I)

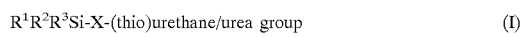

$$R^1R^2R^3Si\text{-}X\text{-(thio)urethane/urea group} \qquad (I)$$

wherein in formula (I)
$R^1$, $R^2$, $R^3$ are the same or different and denote $C_1$–$C_{18}$ alkyl or $C_1$–$C_{18}$ alkoxy and
X stands for linear, branched or cyclic, optionally unsaturated $C_1$–$C_{12}$ alkylene radicals.

The carbon atoms of the hydroxycarboxylic acid component(s) and polyol component(s) can exhibit a straight-chain, branched or cyclic alignment.

The sulfur bridges are preferably $S_x$ bridges, whereby the sulfur can exhibit a straight-chain, branched or cyclic alignment.

The carboxylic acid component has from 10 to 20, preferably 14 to 18, carbon atoms.

A most preferred network is illustrated in FIG. 1.

Synthesis of the networks can be performed by any method known to the person skilled in the art.

However, synthesis is preferably performed by a) reacting an appropriate ester with 0.5 to 25%, preferably 0.5% to 10% sulfur in the presence of one or more primary amines at 120 to 180° C., then b) reacting the mixture with 0.1 to 1.0 mol of a diisocyanate relative to the OH content of the now sulfurized ester, preferably at 20 to 150° C., and then c) reacting the mixture with a silane according to formula (II),

$$R^1R^2R^3Si\text{—}X\text{—}Q \qquad (II)$$

wherein
X stands for linear, branched or cyclic, optionally unsaturated $C_1$–$C_{12}$ alkylene radicals and
Q stands for SH, NH$_2$, N=C=O or N=C=S.

The ester as starting material is produced by reacting unsaturated aromatic or aliphatic hydroxycarboxylic acids and aromatic or aliphatic polyols, wherein the hydroxycarboxylic acid component has 10 to 20, preferably 14 to 18 carbon atoms, which can exhibit a straight-chain, branched or cyclic alignment and each of which has 1 to 3, preferably 1 or 2 olefinic double bonds and hydroxyl groups. The polyol component advantageously displays 1 to 6, preferably 1 to 3 carbon atoms in a straight-chain, branched or cyclic alignment and advantageously has 1 to 6, preferably 1 to 3 hydroxyl groups.

The esters are reacted with 0.5 to 25 wt. % sulfur at 120 to 180° C. with the aid of primary amines as catalysts.

To this end, 0.5 to 25 wt. % sulfur and advantageously 0.05 to 2 wt. % primary amine, relative to the total of all constituents, are added to the esters of unsaturated aromatic or aliphatic hydroxycarboxylic acids and aromatic or aliphatic polyols and the mixture is heated to 120 to 180° C., advantageously for 1 to 12 hours.

Reaction conditions in which 1 to 5 wt. % sulfur is reacted with 0.05 to 1 wt. % primary amine at 130 to 160° C. for 1 to 5 hours are particularly preferred.

Reaction conditions in which 1 to 2 wt. % sulfur is reacted with 0.05 to 0.3 wt. % primary amine at 140 to 160° C. for 1 to 3 hours are most particularly preferred.

The sulfurized esters, thus obtained, can generally be used directly for the subsequent reaction with no additional purification or modification.

The molar ratio of esters to diisocyanate is advantageously in the range from 1.5:1 to 0.5:1, preferably 1.1:1 to 0.9:1.

The reaction is generally performed at a temperature in the range from 20 to 90° C., preferably 40 to 80° C.

Examples of suitable diisocyanates include aliphatic diisocyanates such as e.g. isophorone diisocyanate (IPDI), hexane-1,6-diisocyanate (HDI) or aromatic diisocyanates such as 2,6- and/or 2,4-toluylene diiocyanate (TDI) or 2,2'-diphenylmethane diisocyanate (MDI).

As soon as the reaction mixture exhibits an NCO content displaying half of the unreacted mixture, an amino or mercaptosilane compound according to formula (II) is advantageously added, whereby for the isocyanate-thiol addition a tin-containing catalyst can optionally also be used in a concentration of 0.1 to 2%, preferably 0.1 to 1%, relative to the total reaction batch.

In the reaction between the sulfur-bridged ester and silane (II), the molar ratio of sulfur-bridged ester to silane is advantageously in the range from 1.5:1 to 0.5:1, preferably 1.1:1 to 0.9:1, relative in each case to the functional groups in the two reactants.

The reaction is preferably performed without solvents.

If the reaction is performed without a catalyst, the temperature should be in the range from 20 to 90° C., preferably 40 to 80° C. The reaction is advantageously continued until an NCS or NCO content of <0.1% can be determined.

The use of a tin-containing catalyst for the addition reaction in a concentration in the range from 0.1 to 2%, preferably 0.1 to 1%, relative to the total reaction batch, is frequently advantageous, however. In this case the temperatures are advantageously in the range from 0 to 60° C., preferably 20 to 50° C. In this case too the reaction is advantageously continued until an NCS or NCO content of <0.1% can be determined.

The coupling between silane and sulfur-containing esters of unsaturated aromatic or aliphatic hydroxycarboxylic acids can also advantageously be achieved by reacting an isocyanatosilane or isothiocyanatosilane with sulfur-containing esters of unsaturated aromatic or aliphatic hydroxycarboxylic acids.

The invention further concerns rubber compounds containing at least one network (a) according to the present invention, at least one double bond-containing rubber (b) and at least one silicon-containing filler (c), whereby they can optionally additionally contain rubber additives and other fillers.

The content of (a) is present in the range from 1 to 20, preferably 5 to 10 parts by weight, the content of (b) 100 parts by weight and the content of (c) is in the range from 50 to 90, preferably 70 to 90 parts by weight.

Rubbers designated as R rubbers according to DIN/ISO 1629 are suitable as the double bond-containing rubber (b). These rubbers have a double bond in the main chain. They include, for example:

| | |
|---|---|
| NR: | natural rubber |
| SBR: | styrene-butadiene rubber |
| BR: | polybutadiene rubber |
| NBR: | nitrite rubber |
| IIR: | butyl rubber |
| HNBR: | hydrogenated nitrile rubber |
| SNBR: | styrene-butadiene-acrylonitrile rubber |
| CR: | polychloroprene |
| XSBR: | carboxylated styrene-butadiene rubber |
| XNBR: | carboxylated butadiene-acrylonitrile rubber |
| ENR: | epoxidized natural rubber |
| ESBR: | epoxidized styrene-butadiene rubber |

Rubbers that are designated as M rubbers according to DIN/ISO 1629 and contain double bonds in side chains in addition to the saturated main chain are also suitable, however. These include EPDM, for example.

NR, BR, SBR, IIR and EPDM are preferred.

Any silicon-containing filler known to the person skilled in the art is suitable as the silicon-containing filler (c). The following are mentioned in particular:

1. Fine-particle silica, produced e.g. by precipitating solutions of silicates or by flash hydrolysis of silicon halides with specific surface areas in the range from 5 to 1000, preferably 20 to 400 m$^2$g$^{-1}$ (BET surface area according to DIN 66 131) and primary particle sizes in the range from 5 to 400 nm (determinable e.g. according to Cornillaut, Appl. Opt. 1972, 11, 265). The silicas can optionally also be present as mixed oxides with other metal oxides, such as Al, Mg, Ca, Ba, Zn and Ti oxides;

2. Synthetic silicates, such as aluminium silicate, alkaline-earth silicate, such as magnesium silicate or calcium silicate with BET surface areas in the range from 20 to 400 m$^2$g$^{-1}$ and primary particle diameters in the range from 5 to 400 nm;

3. Natural silicates, such as kaolin, zeolites and other naturally occurring silicas;

4. Glass fibers and glass fiber products (strips, strands or glass microbeads).

Fine-particle silicas and synthetic and natural silicates are preferred.

The rubber compounds according to the present invention can also contain other rubber additives and fillers.

Particularly suitable additional fillers for production of the rubber compounds and vulcanizates according to the present invention are:

1. Carbon blacks. The carbon blacks for use in this connection are produced according to the lamp black, furnace black or channel black method and have BET surface areas in the range from 20 to 200 m$^2$g$^{-1}$, such as e.g. SAF, ISAF, IISAF, HAF, FEF or GPF carbon blacks;

2. Metal oxides, such as zinc oxide, calcium oxide, magnesium oxide, aluminium oxide;
3. Metal carbonates, such as calcium carbonate, magnesium carbonate, zinc carbonate;
4. Metal sulfates, such as calcium sulfate, barium sulfate;
5. Metal hydroxides, such as aluminium hydroxide and magnesium hydroxide;
6. Thermoplastic fibers (polyamide, polyester, aramide).

The specified fillers can be used alone or in combination. In a preferred embodiment of the process, 70 to 85 parts by weight of silicon-containing filler (c), optionally together with 5 to 10 parts by weight of carbon black, based in each case on 100 parts by weight of rubber (b), are used.

The rubber compounds according to the present invention can moreover also contain conventional rubber additives, such as reaction accelerators, antioxidants, heat stabilizers, light stabilizers, anti-ozonants, processing aids, plasticizers, tackifiers, blowing agents, dyestuffs, pigments, wax, extenders, organic acids, retarders, metal oxides, and filler activators such as triethanol amine, polyethylene glycol, hexane triol or others known in the rubber industry.

The rubber additives are generally used in conventional quantities, which are governed inter alia by the intended application. Conventional quantities in this case are quantities in the range from 0.1 to 50 wt. %, relative to the quantities of rubber (b) used.

In order to obtain crosslinkable rubber compounds, which are a further component of the invention, crosslinking agents must be added to the rubber compounds according to the invention.

All crosslinking systems known to the person skilled in the art can be used as crosslinking agents. Sulfur, sulfur donors, peroxides or other crosslinking agents, such as e.g. diisopropenyl benzene, divinyl benzene, divinyl ether, divinyl sulfone, diallyl phthalate, triallyl cyanurate, 1,2-polybutadiene, N,N'-m-phenylene maleimide and/or triallyl trimellitate, for example, are suitable.

Other possibilities include the acrylates and methacrylates of polyhydric, preferably dihydric to tetrahydric $C_2$ to $C_{10}$ alcohols, such as ethylene glycol, propanediol, 1,2-butanediol, hexanediol, polyethylene glycol with 2 to 20, preferably 2 to 8, oxyethylene units, neopentyl glycol, bisphenol A, glycerol, trimethylol propane, pentaerythritol, sorbitol with unsaturated polyesters of aliphatic diols and polyols together with maleic acid, fumaric acid and/or itaconic acid.

The crosslinkable rubber compounds according to the present invention can also contain vulcanization accelerators. Examples of suitable vulcanization accelerators are mercaptobenzothiazols, mercaptosulfenamides, guanidines, thiurams, dithiocarbamates, thio ureas and thiocarbonates together with dithiophosphates.

The vulcanization accelerators, sulfur and sulfur donors or peroxides or other crosslinking agents, such as e.g. dimeric 2,4-toluylene diisocyanate or 1,4-bis-1-ethoxyhydroquinone, are generally used in quantities ranging from 0.1 to 40 wt. %, preferably 0.1 to 10 wt. %, relative to the total quantity of rubber (b) used. Vulcanization of the crosslinkable rubber compounds according to the invention can be performed at temperatures in the range from 100 to 250° C., preferably in the range from 130 to 180° C., optionally under pressure in the range from 10 to 200 bar.

The present invention also provides a compounding process for the rubber compounds according to the present invention or the crosslinkable rubber compounds according to the invention, characterized in that the components are mixed in a mixing device at temperatures above 130° C., preferably in the range from 140 to 200° C., most preferably in the range from 150° C. to 180° C. Internal mixers or compounding extruders are particularly suitable.

Rubber additives and other fillers can optionally be used.

The addition of other compound components to the rubber compound according to the present invention or to the crosslinkable rubber compound according to the present invention can be performed in the compounding process according to the present invention or in a subsequent processing stage in conventional equipment such as e.g. rolls, calenders or extruders. Preferred compounding temperatures are in the range from 50 to 180° C.

Corresponding vulcanizates can be produced from the crosslinkable rubber compounds according to the present invention by means of vulcanization, these vulcanizates being suitable for the production of shaped articles, e.g. for the production of cable sheaths, hoses, drive belts, conveyor belts, roll coverings, tires, especially tire treads, shoe soles, sealing rings and damping elements, as well as membranes, preferably for the production of tire treads.

EXAMPLES

Example 1

Sulfurization and Subsequent Functionalization of Castor Oil

Amounts used: 200.0 g castor oil
4.2 g sulfur
0.2 g Primene 81 R®

Method: The batch is stirred for 2 hours under $N_2$ at 150° C. The castor oil darkens.

ASTM color: 6.5

After being allowed to stand for 3 days at room temperature, the product was clear.

106.4 g of this product were then weighed out=0.1 mol
23.3 g isopropyl diisocyanate, NCO content: 39.7%=0.11 mol NCO content of mixture=7.1%

Method: The IPDI was added to the prepared sulfurized castor oil over 10 min at 50° C. whilst being stirred.

The mixture was stirred for 6 hours at 50° C. NCO content: 3.4%

24.4 g 3-aminopropyltriethoxysilane=105% at NCO content were added to the above batch at room temperature over 30 min. Exothermic reaction; cool. Secondary reaction=2 h at room temperature.

At room temperature the product was a clear, brown, viscous, free-flowing compound.

NCO content: 0.3% (excess "amino silane").

Analysis: GPC: polymer chain distribution, small quantities of a low-molecular substance explained by the reaction of water in castor oil with diisocyanate.

Conclusion

Practical and simple synthesis reaction, one-component multi-stage reaction.

Example 2

Application-oriented examination of a rubber compound according to the present invention.

TABLE 1

Formulation 1

| Compound component | Compound 1 phr | Compound 2 phr |
|---|---|---|
| Buna CB 24 | 30 | 30 |
| Buna VSL 5025-1 | 96 | 96 |
| Vulkasil S | 80 | 80 |
| ZnO active | 3 | 3 |
| Stearic acid | 2 | 2 |
| Vulkanox 4010 NA | 1.5 | 1.5 |
| Vulkanox HS | 1 | 1 |
| Aktiplast ST | 4 | 4 |
| Naftolen ZD | 10 | 10 |
| Antilux 654 | 1 | 1 |
| 3,3-bis(triethoxysilylpropyl)tetrasulfide | 6.4 | — |
| Product from example 1 | — | 6.4 |
| Sulfur | 1.7 | 1.7 |
| Vulkacit D | 2 | 2 |
| Vulkacit CZ | 1.7 | 1.7 |
| Rhenocure SDT/S | — | 2 |
| Addition of silane derivatives [mol] | $5.94 \times 10^{-2}$ | $1.06 \times 10^{-2}$ |
| Ejection temperature | 145 | 155 |
| Number of mixing stages | 3 | 3 |
| 3,3-bis(triethoxysilylpropyl)tetrasulfide | 539 | |
| Product from example 1 [g/mol] | | 3000 |
| Compound testing | | |
| Mooney viscosity ML 1 + 4, 100° C., DIN 53523, [ME] | 54 | 55 |
| Mooney scorch, 120° C., DIN 53523 | | |
| t5 [min] | 27.2 | 24.7 |
| t35 [min] | 36.8 | 29.2 |
| Rheometer test, 160° C., DIN 53529 | | |
| $t_{10\%}$ [min] | 4.5 | 3.9 |
| $t_{90\%}$ [min] | 10.2 | 9.2 |
| $t_{95\%}$ [min] | 12.1 | 9.9 |
| Torque differential [Nm] | 38.6 | 37.8 |
| Vulcanization test after 160° C./$t_{95\%}$ | | |
| Impact resilience, 23° C., DIN 53512, [%] | 35 | 37 |
| Impact resilience, 70° C., DIN 53512, [%] | 53 | 54 |
| Shore-A hardness, 23° C., DIN 53505 | 68 | 63 |
| 25% modulus, 23° C., DIN 53504, [MPa] | 1.15 | 1.18 |
| 100% modulus, 23° C., DIN 53504, [MPa] | 3.1 | 2 |
| 300% modulus, 23° C., DIN 53504, [MPa] | 12 | 7.5 |
| Tensile strength, 23° C., DIN 53504, [MPa] | 17.9 | 16.1 |
| Elongation at break, 23° C., DIN 53504, [%] | 451 | 524 |
| 300 modulus / 100 modulus | 3.9 | 3.8 |
| Compression set, 1 day, 70° C., [%] | 24 | 22 |
| Abrasion, 23° C., DIN 53516, [mm³] | 96 | 108 |
| Viscoelastic properties, DIN 53513 | | |
| tan d, 0° C. | 0.41 | 0.419 |
| tan d, 70° C. | 0.135 | 0.139 |

Buna ® CB 24: Bayer AG, polybutadiene, Mooney viscosity 38–48 (1 + 4, 100° C.)
Buna ® VSL 5025-1: Bayer AG, SBR rubber (Mooney viscosity 50 (ML 1 + 4, 100° C.)
Vulkasil ® S: Bayer AG, active silica
ZnO active: Bayer AG
Vulkanox ® 4010 NA: Bayer AG, N-isopropyl-N'-phenyl-p-phenylene diamine
Vulkanox ® HS: Bayer AG, oligomerized 2,2,4-trimethyl-1,2-dihydroquinoline
Aktiplast ® ST: Rhein Chemie Rheinau GmbH, mixture of hydrocarbons, zinc soaps and fillers
Naftolen ZD: Chemetall GmbH, aromatic lubricating plasticizer
Antilux ® 654: Rhein Chemie Rheinau GmbH, light stabilizing wax
Vulkacit ® D: Bayer AG, diphenyl guanidine
Vulkacit ® CZ: Bayer AG, N-cyclohexyl-2-benzothiazylsulfenamide
Rhenocure ® SDT: Rhein Chemie Rheinau GmbH, sulfur donor It is clear from this example that when the polymeric organic silane according to the invention is used, the molar quantity corresponds to less than ⅕ of that of 3,3-bis(triethoxysilylpropyl)tetrasulfide, but comparable rubber properties are obtainable with this smaller molar quantity and at elevated compounding temperature, thereby reducing the scrap rate in production and hence improving the productivity of the overall process.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A network comprising esters of one or more unsaturated aromatic or aliphatic hydroxycarboxylic acids and one or more aromatic or aliphatic polyols, crosslinked with sulfur bridges, wherein said network comprises a sulfur content in the range from 0.2 wt. % to 17 wt. %, and wherein
   a) the hydroxycarboxylic acid(s) each comprise 1, 2 or 3 olefinic double bonds and hydroxyl groups or hydroxyl and isocyanate groups,
   b) the polyol component(s) each comprise 1 to 6 carbon atoms and 1 to 6 hydroxyl groups and optionally isocyanate groups,
   c) the network comprises (thio)urethane or urea substituents, which in turn have one or more terminal silane substituents according to formula (I)

$$R^1R^2R^3Si\text{-}X\text{-}(thio)urethane/urea\ group \qquad (I)$$

wherein in formula (I)
   $R^1, R^2, R^3$ are the same or different and denote $C_1$–$C_{18}$ alkyl or $C_1$–$C_{18}$ alkoxy and
   X represents linear, branched or cyclic, optionally unsaturated $C_1$–$C_{12}$ alkylene radicals.

2. Network according to claim 1, wherein the sulfur content is in the range from 0.5 wt. % to 10 wt. %.

3. The network according to claim 1, wherein the hydroxycarboxylic acid(s) comprises 10 to 20 carbon atoms.

4. A process for the production of a network comprising esters of one or more unsaturated aromatic or aliphatic hydroxycarboxylic acids and one or more aromatic or aliphatic polyols, crosslinked with sulfur bridges comprising the following steps in the order of
   a) reacting the ester with 0.5 to 25 wt. % sulfur in the presence of one or more primary amines at 120 to 180° C. to form a mixture,
   b) reacting the mixture with 0.1 to 1.0 mol of a diisocyanate relative to the OH content of the sulfurized ester to form a further mixture, and
   c) reacting the further mixture with a silane according to formula (IIa), $$R^1R^2R^3Si\text{—}X\text{—}Q \qquad (IIa)$$

wherein
   X stands for linear, branched or cyclic, optionally unsaturated $C_1$–$C_{12}$ alkylene radicals and
   Q stands for SH, $NH_2$, N=C=O or N=C=S.

5. Rubber compounds comprising
   a) at least one network comprising esters of one or more unsaturated aromatic or aliphatic hydroxycarboxylic acids and one or more aromatic or aliphatic polyols, crosslinked with sulfur bridges, wherein said network comprises a sulfur content in the range from 0.2 wt. % to 17 wt. %, and wherein
      i) the hydroxycarboxylic acid(s) each comprise 1, 2 or 3 olefinic double bonds and hydroxyl groups or hydroxyl and isocyanate groups,
      ii) the polyol component(s) each comprise 1 to 6 carbon atoms and 1 to 6 hydroxyl groups and optionally isocyanate groups, iii) the network comprises (thio)urethane or urea substituents, which in turn have one or more terminal silane substituents according to formula (I)

$R^1R^2R^3Si-X-(thio)urethane/urea$ group (I)

wherein in formula (I)
$R^1$, $R^2$, $R^3$ are the same or different and denote $C_1-C_{18}$ alkyl or $C_1-C_{18}$ alkoxy and
X represents linear, branched or cyclic, optionally unsaturated $C_1-C_{12}$ alkylene radicals.

b) at least one double bond-containing rubber and c) at least one silicon-containing filler, and optionally additional rubber additives and other fillers.

6. Rubber compounds according to claim 5, wherein the content of (a) is in the range from 1 to 20 parts by weight, the content of (b) is 100 parts by weight and the content of (c) is in the range from 50 to 90 parts by weight.

7. Rubber compounds according to claim 5, wherein said rubber (b) is selected from the group consisting of NR, BR, SBR, IIR and mixtures of 2 or more members of the group.

8. Rubber compounds according to claim 5, wherein the filler (c) is selected from the group consisting of silicas, silicon dioxide, silica gels or natural silicates, synthetic silicates or mixtures of 2 or more members of the group.

9. A compounding process for rubber compounds comprising the step of compounding rubber compounds in a mixing device at temperatures above 155° C., wherein the rubber compound comprises:

a) at least one network comprising esters of one or more unsaturated aromatic or aliphatic hydroxycarboxylic acids and one or more aromatic or aliphatic polyols, crosslinked with sulfur bridges, wherein said network comprises a sulfur content in the range from 0.2 wt. % to 17%, and wherein
i) the hydroxycarboxylic acid(s) each comprise 1, 2 or 3 olefinic double bonds and hydroxyl groups or hydroxyl and isocyanate groups,
ii) the polyol component(s) each comprise 1 to 6 carbon atoms and 1 to 6 hydroxyl groups and optionally isocyanate groups,
iii) the network comprises (thio)urethane or urea substituents, which in turn have one or more terminal silane substituents according to formula (I)

$R^1R^2R^3Si-X-(thio)urethane/urea$ group (I)

wherein in formula (I)
$R^1$, $R^2$, $R^3$ are the same or different and denote $C_1-C_{18}$ alkyl or $C_1-C_{18}$ alkoxy and
X represents linear, branched or cyclic, optionally unsaturated $C_1-C_{12}$ alkylene radicals.

b) at least one double bond-containing rubber and c) at least one silicon-containing filler, and optionally additional rubber additives and other fillers.

10. Compounding process according to claim 9, wherein said mixing device is an internal mixer or a compounding extruder.

11. A molded article comprising a rubber compounds comprising a) at least one network comprising esters of one or more unsaturated aromatic or aliphatic hydroxycarboxylic acids and one or more aromatic or aliphatic polyols, crosslinked with sulfur bridges, wherein said network comprises a sulfur content in the range from 0.2 wt. % to 17%, and wherein
i) the hydroxycarboxylic acid(s) each comprise 1, 2 or 3 olefinic double bonds and hydroxyl groups or hydroxyl and isocyanate groups,
ii) the polyol component(s) each comprise 1 to 6 carbon atoms and 1 to 6 hydroxyl groups and optionally isocyanate groups,
iii) the network comprises (thio)urethane or urea substituents, which in turn have one or more terminal silane substituents according to formula (I)

$R^1R^2R^3Si-X-(thio)urethane/urea$ group (I)

wherein in formula (I)
$R^1$, $R^2$, $R^3$ are the same or different and denote $C_1-C_{18}$ alkyl or $C_1-C_{18}$ alkoxy and
X represents linear, branched or cyclic, optionally unsaturated $C_1-C_{12}$ alkylene radicals.

b) at least one double bond-containing rubber and c) at least one silicon-containing filler, and optionally additional rubber additives and other fillers.

* * * * *